(12) United States Patent
Lotan et al.

(10) Patent No.: US 9,032,304 B2
(45) Date of Patent: May 12, 2015

(54) INTERACTION WITH NETWORKED SCREEN CONTENT VIA MOBILE PHONE IN RETAIL SETTING

(75) Inventors: Gilad Lotan, Cambridge, MA (US); George Moromisato, Seattle, WA (US); Paresh Suthar, Austin, TX (US); Jack Ozzie, North Bend, WA (US); Lili Cheng, Bellevue, WA (US); Florin Gale, Kirkland, WA (US); Justin Michael Harrison, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 406 days.

(21) Appl. No.: 12/941,711

(22) Filed: Nov. 8, 2010

(65) Prior Publication Data

US 2012/0117487 A1 May 10, 2012

(51) Int. Cl.
*G06F 3/048* (2013.01)
*G06Q 30/06* (2012.01)
*G06F 9/44* (2006.01)

(52) U.S. Cl.
CPC .......... *G06Q 30/0641* (2013.01); *G06F 9/4445* (2013.01)

(58) Field of Classification Search
USPC .......................................................... 715/747
See application file for complete search history.

(56) References Cited

U.S. PATENT DOCUMENTS

| | | | |
|---|---|---|---|
| 7,624,192 B2 | 11/2009 | Meyers et al. | |
| 8,260,269 B2 * | 9/2012 | Faith et al. | 455/414.1 |
| 2002/0133545 A1 * | 9/2002 | Fano et al. | 709/203 |
| 2005/0079895 A1 * | 4/2005 | Kalenius et al. | 455/566 |
| 2006/0036485 A1 | 2/2006 | Duri et al. | |
| 2008/0140380 A1 * | 6/2008 | Marsyla et al. | 703/26 |
| 2009/0256718 A1 | 10/2009 | Lockett et al. | |
| 2009/0313324 A1 | 12/2009 | Brooks et al. | |
| 2010/0111491 A1 | 5/2010 | Kamoto | |
| 2010/0203833 A1 | 8/2010 | Dorsey | |
| 2010/0229045 A1 * | 9/2010 | Schultz et al. | 714/37 |

OTHER PUBLICATIONS

Is this the future of interactive retail screen media?—Published Date: Aug. 16, 2010, http://www.retailcustomerexperience.com/article/139750/Is-this-the-future-of-interactive-retail-screen-media.
Interactive Rear Projection Screens from Visual Planet—Retrieved Date: Sep. 29, 2010, http://www.visualplanet.biz/products/interactivescreens/?gclid=CMff3NPCrKQCFUH92AodsQ_6aQ.

* cited by examiner

*Primary Examiner* — Peiyong Weng
(74) *Attorney, Agent, or Firm* — Micah Goldsmith; Judy Yee; Micky Minhas

(57) ABSTRACT

A portable computing device may be configured to allow a user to interact with one or more displays in a retail environment. The portable computing device may establish a communication link with a communication device in the retail environment and the user may be able to use the portable computing device to navigate through retail data and have it displayed on the display device in the retail environment.

20 Claims, 5 Drawing Sheets

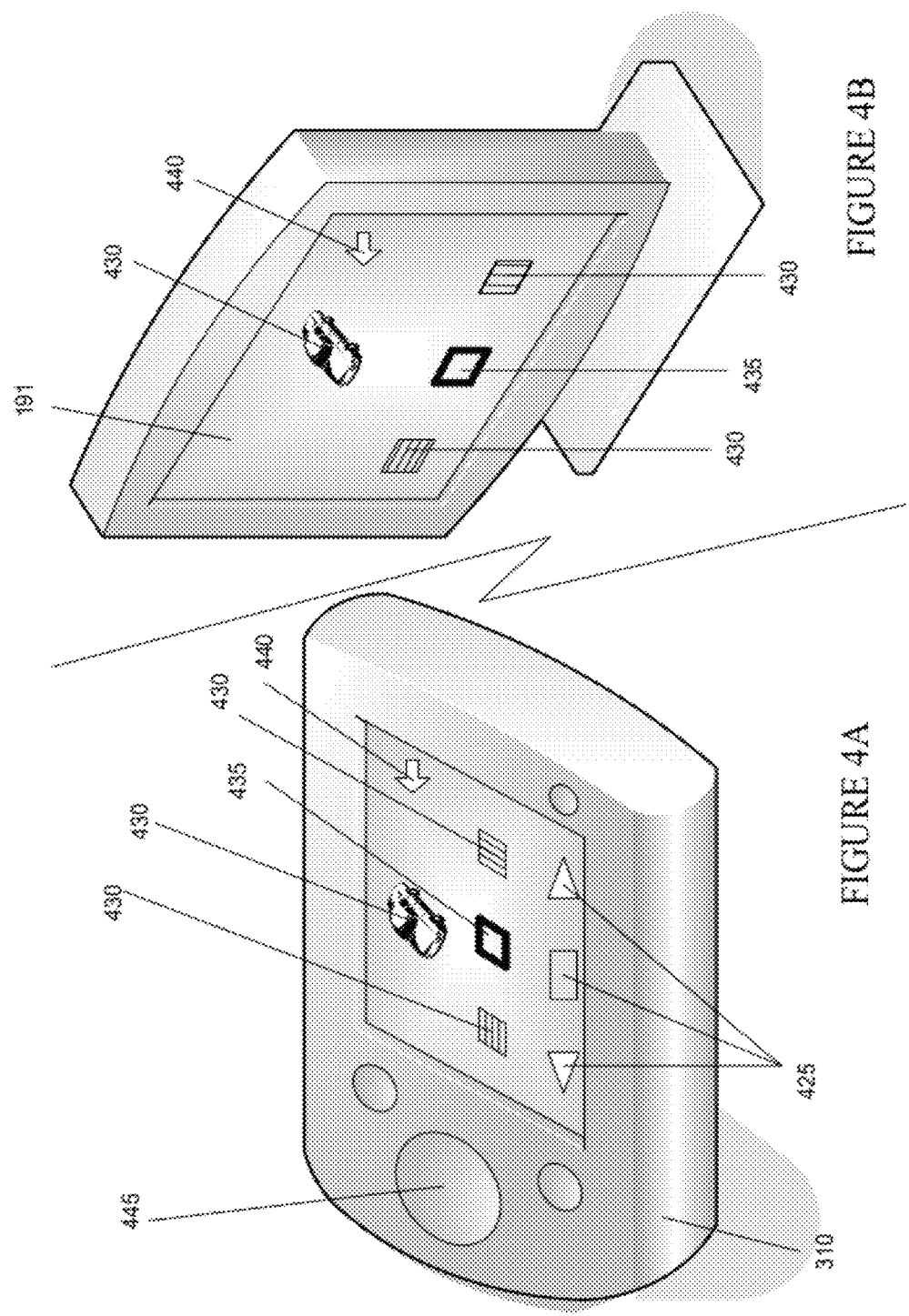

INTERACTION WITH NETWORKED SCREEN CONTENT VIA MOBILE PHONE IN RETAIL SETTING

BACKGROUND

In a retail environment, trying to gain attention of shoppers is more and more challenging. Traditional displays may be ignored or may have little effect as shoppers assume there is nothing new on the display device. In addition, the content displayed does not change frequently, causing users to be bored with the displays.

Electronic advertisements may be more eye-catching that traditional static displays. However, even electronic displays that change over time can lose their effectiveness as shoppers become familiar with the content. Further, the lack of interaction with the display device means a retailer decides what is displayed to a user, rather than allowing the user to decide.

In addition, users are accustomed to being in control of electronic displays, both on portable devices and on larger displays. The attention span of shoppers continues to drop and traditional methods of pushing advertisements to users have less and less effect. Pushing advertisements to cell phones of users as they are near has been tried but users still find the advertisements to be of questionable value and potentially intrusive. Further, most advertisements are not additional, un-seen information, but old information repackaged. Finally, the shopper does not have the ability to manipulate a display device toward specific information desired by the user.

SUMMARY

By allowing a user to control a display device in a retail store using a portable computing device, additional interest in the store, services or products may be generated. A portable device physically configured according to computer executable instructions may establish communication between the mobile communication device and a receiving device in the retail store. An indication may be received that an application is available to interact with the display device in the retail store. If the application is not installed on the mobile communication device, an option may be displayed to download the application to the mobile communication device. If the application is installed on the mobile communication device, a user interface may be displayed on the mobile communication device that allows a user to perform one or more gestures that affect the display device in the retail store where the display device in the retail store may include retail related data and at least one selectable area or item.

Inputs from the mobile communication device may be communicated to the display device in the retail environment to move an indication on the display device in the retail store related to the inputs on the mobile communication device. The indication on the display device in the retail store may be maneuvered over selectable areas/items and using the inputs on mobile communication device to select a selectable area/items on the display device. An adjusted image may be displayed on the display device in response to the selected item wherein the adjusted image may include additional retail related data and at least one selectable area. The user interface of mobile communication device may be modified to reflect the adjusted image on the display device in the retail store.

DESCRIPTION OF THE FIGURES

FIG. 4a illustrates an image of a user interface on the mobile computing device;

FIG. 4b illustrates a display device in the retail environment;

SPECIFICATION

Figure 1:
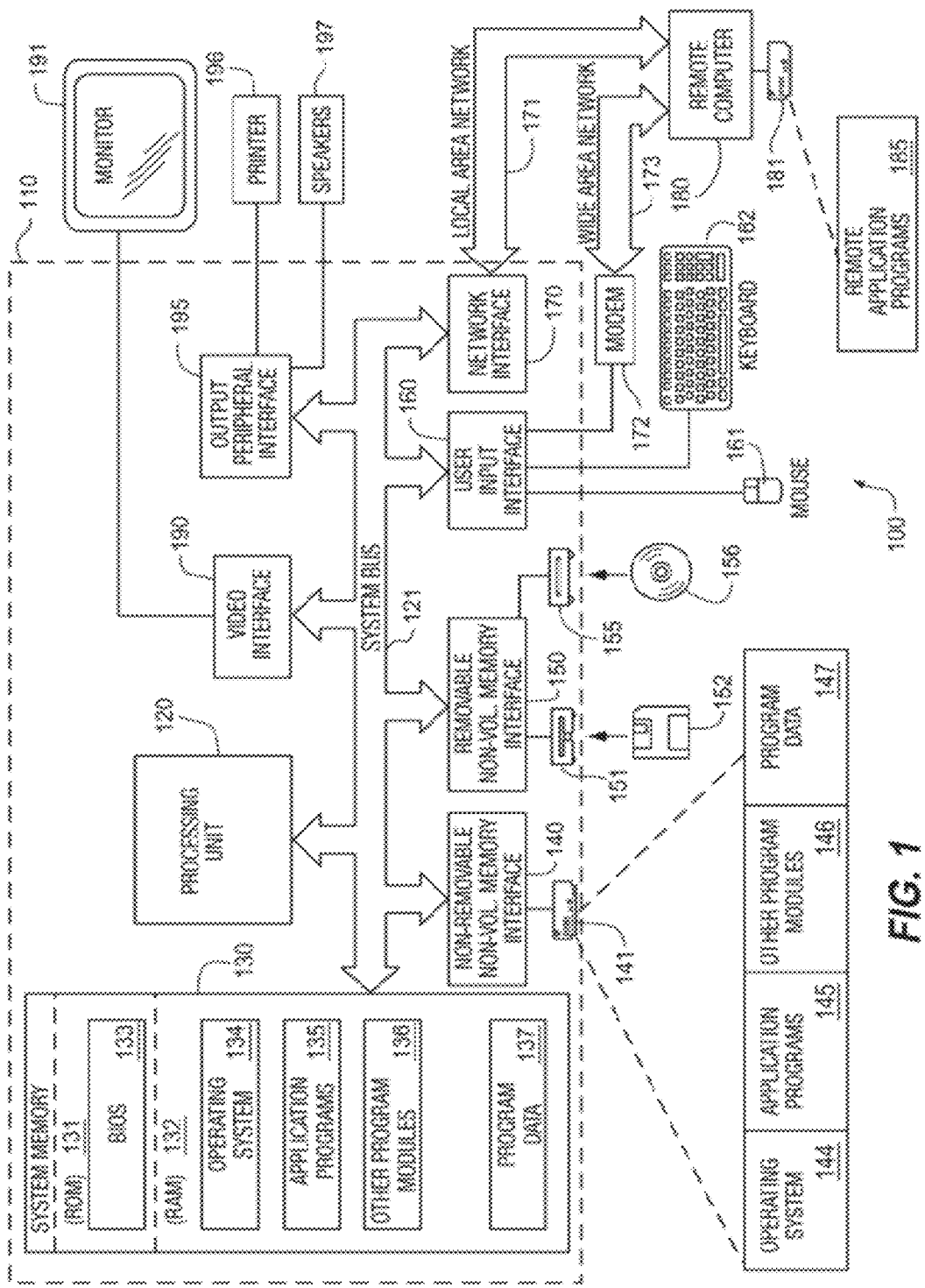
FIG. 1 illustrates a sample computing device that may be physically configured according to computer executable instructions.

FIG. 1 illustrates an example of a suitable computing system environment 100 that may be physically configured to operate, display device and provide a user interface described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100. In one embodiment, the device described in the specification is entirely created out of hardware as a dedicated unit that is physically transformed according to the description of the specification and claims. In other embodiments, the device executes software and yet additional embodiment, the device is a combination of hardware that is physically transformed and software.

With reference to FIG. 1, an exemplary system that may be physically configured for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170. In addition, not all the physical components need to be located at the same place. In some embodiments, the processing unit 120 may be part of a cloud of processing units 120 or computers 110 that may be accessed through a network.

Computer 110 typically includes a variety of computer readable media that may be any available media that may be accessed by computer 110 and includes both volatile and nonvolatile media, removable and non-removable media. The system memory 130 may include computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to an optical disk 156. The hard disk drive 141, 151, and 155 may interface with system bus 121 via interfaces 140, 150. However, none of the memory devices such as the computer storage media are intended to cover transitory signals or carrier waves.

A user may enter commands and information into the computer 110 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

In additional embodiments, the processing unit 120 may be separated into numerous separate elements that may be shut down individually to conserve power. The separate elements may be related to specific functions. For example, an electronic communication function that controls wi-fi, Bluetooth, etc, may be a separate physical element that may be turned off to conserve power when electronic communication is not necessary. Each physical element may be physically configured according to the specification and claims described herein.

Figure 2:
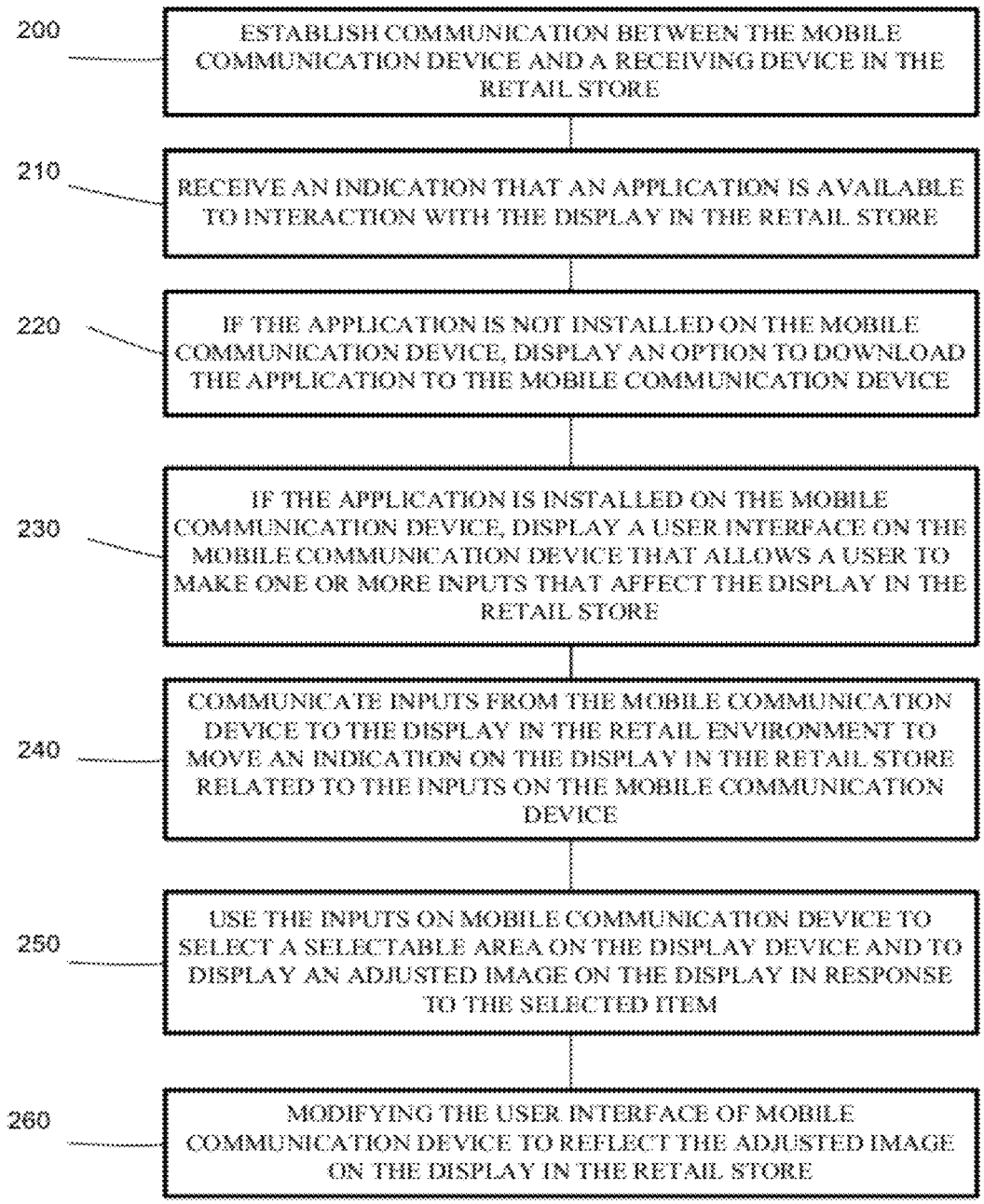
FIG. 2 illustrates steps that are executed by the physically configured portable computing device.
Figure 3:
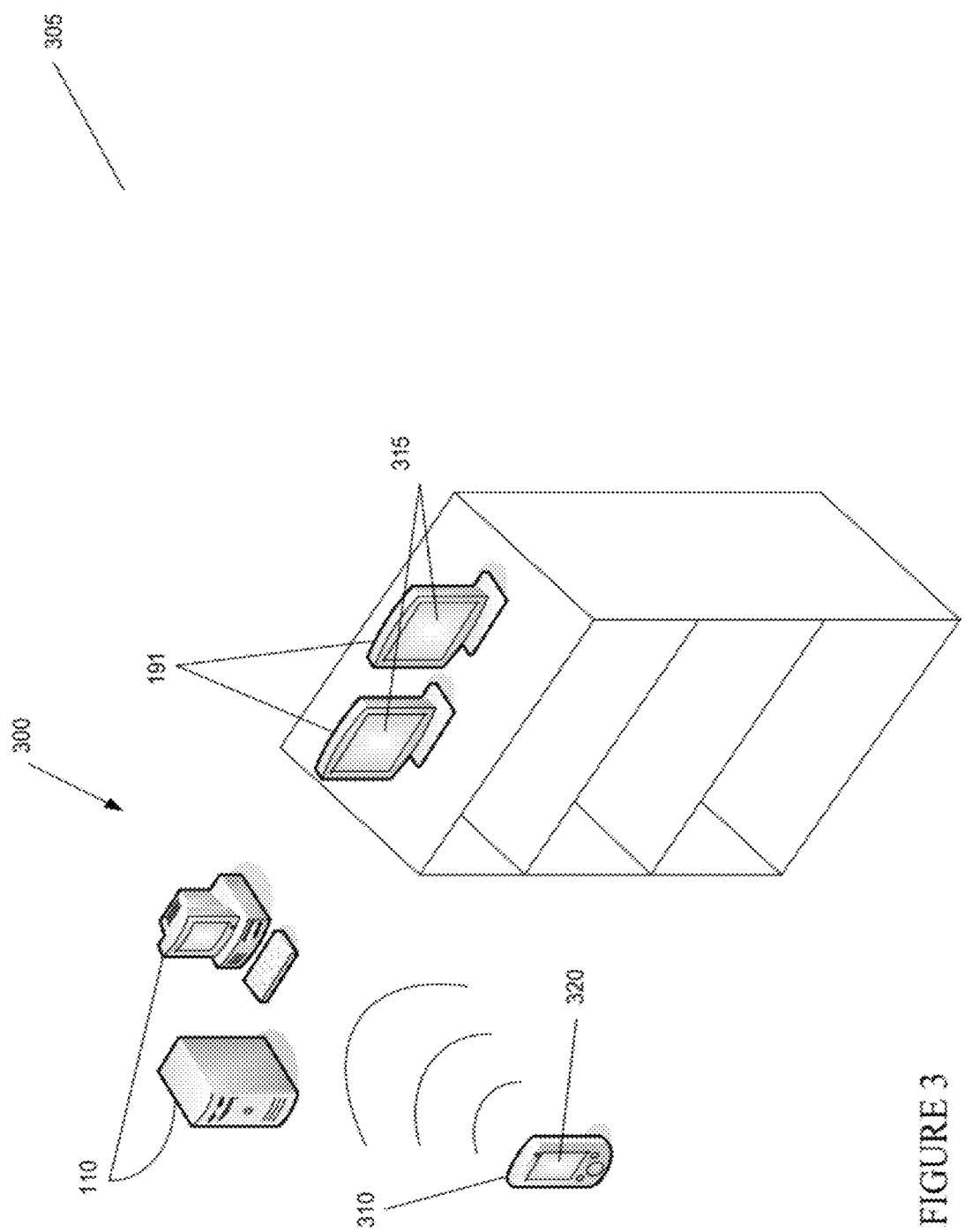
FIG. 3 illustrates a retail environment with a computing device, a portable computing device and a display.

FIG. 2 may illustrate a method of communicating with a display device 191 in a retail store 305 using a mobile communication device 310. The retail store 305 may be a physical location that sells goods or services or a combination thereof. The retail store may have one or more displays 300 such as an LCD display, plasma display, OLED display, a projector of any type and a display device area or CRT display device 191. The type of the display device 191 may be store dependant as some retail stores may have space constraints that may drive the display device 191 selection. The display device 191 may be in close proximity of the computer 110 or may be remote from the computer 110 and may be in communication with the computer 110 through wired or wireless communication. In some embodiments, the computer 110 may be remote or in a "cloud" with only a communication device being present in the retail environment 305.

In addition, the retail store 305 may have a computer 110 such as a computer 110 described in FIG. 1. The computer 110 may be configured to handle and serve the video images for the display, communicate with the mobile communication device 310 and store the data, such as catalog data or sale data, to be displayed as images 315 on the display device 191. The computer 110 may be a single computer configured to handle all the necessary tasks or could be part of a networked system that separates the various tasks over a plurality of computers 110 and processing units 120, including processing units that operate remotely in a cloud.

The mobile communication device 310 may be any cellular phone, personal digital assistant (PDA), pad computing device, laptop, tablet computing device or purpose built in store device that is capable of wireless communication. The device may be similar to the device described in FIG. 1, having a processing unit 120, a display device 191, a memory 130 and communication capabilities through a network interface 170, for example. As mentioned previously, the processing unit 120 may be broken into several elements that may be turned on and off as needed to conserve battery life. The communication capabilities may include wifi, cellular, Bluetooth, IR or any other available wireless communication capability.

At block 200, on the mobile communication device 310, communication may be established between the mobile communication device 310 and a receiving device in the retail store such as a computer 110. The establishment of communication may be related to the type of communication that is occurring. In one example and not limitation, the communication is through wifi and the terms of communication may be negotiated between the mobile communication device 310 and the computing device 110 at the retail store 300 according to standard methods In some embodiments, the computer 110 may be configured to determine if the user is a known user. The determination may be made in several ways. In some examples, the electronic signals may be received from the mobile computing device 310 and the electronic signals may be analyzed to determine if the electronic signals are recognized as belonging to a known user. The electronic signals may be an identification signal of the mobile computing device 310, for example. In another embodiment, the mobile computing device 310 user may be asked to enter identification information and this information may be reviewed to determine if the identification information is recognized. Similar procedures may be followed if the communication may be through Bluetooth, through the cellular network or through any other appropriate communication method.

If the user is not known, the computer 110 may collect and store data about the user so that in the future, the user will be recognized. In some embodiments, the user is given the option whether to have the information stored.

At block 210, an indication may be received on the mobile computing device 310 that an application is available to interact with the display device 191 in the retail store 305. In one embodiment, the computing device 110 communicates a signal to the mobile electronic device 310 that the application is available. In another embodiment, wifi may be available in the retail environment 305 and part of the acceptance of terms page may also include a message that an application is available to the mobile computing device 310. Of course, other embodiments are possible and are contemplated.

At block 220, if the application is not installed on the mobile communication device 310, an option may be displayed to download the application to the mobile communication device 310. If the application is already present on the mobile communication device 310, the application may check whether there is a more recent application available and the more recent application may be displayed as being available. The application may be a "thin" application that is tailored to operate with an existing operating system on the mobile computing device 310. In some embodiments, the type of mobile computing device 310 may be able to be determined and an application designed specifically for that mobile computing device 310 may be communicated. The option may be displayed as a pop-up balloon that may be accepted or declined or may be communicated in any other appropriate manner. Once the proposed application is accepted, the application may be communicated to the mobile computing device 310 and installed. In some embodiments, the processor and memory will be physically transformed according to the application.

At block 230, if the application is installed on the mobile communication device 310, a user interface 320 may be displayed on the mobile communication device 310 that allows a user to make one or more inputs that affect the display device 191 in the retail store. The user interface 320 may display a size appropriate version of the image 315 on the display device 191 in the retail environment 305. The user interface 320 of the mobile communication device 310 may also contain navigation selections 425 that control the display device 191 in the retail environment 305. In some embodiments, the navigation selections 425 are displayed in a separate region of the display, such as the bottom or at the sides. The navigation selections 425 may also be related to the data being displayed. For example, if the image 315 being displayed is a catalog, the navigation selections 425 may be displayed as the option to flip a page. If the retail environment 305 is a car store, the navigation selection 425 may be a scroll bar to scroll over different models or different colors on a specific model. Of course, numerous other embodiments are possible and are contemplated.

The selectable 430 areas or items may be highlighted 435 on the user interface 320 on the mobile communication device 310 or the selectable areas 430 may be highlighted 435 on the display device 191 when the user moves a pointer over the selectable areas 430. The highlighting may indicate that additional information is available or that a sale is occurring, for example. The highlighting 435 may indicate the type of event that is occurring. As an example and not a limitation, red highlighting 435 may indicate a close-out sale whereas blue highlighting 435 may indicate a new item. Of course, additional methods of using highlighting 435 to gain attention are possible and are contemplated.

The display device 191 in the retail store 305 may illustrate retail related data and at least one selectable area 430. As the display device 191 in the retail store 305 is larger, it may contain additional data that is not displayed on the mobile computing device 310. In one embodiment, a ribbon is on one of more sides of the display device 191 that displays store retailed data in a crawling manner. In another embodiment, the crawling data in the ribbon is specific to the user. In yet another embodiment, the crawling data is related to the item or items that are currently on the display device 191. The display device 191 may be in communication with the computing device 110 through traditional wired methods or through wireless methods.

In some embodiments, there are multiple displays 191 in the retail environment 305. The displays 191 may be next to each other, may be stacked on top of each other, may form a perimeter around the retail environment 300 or the displays 191 may be in various combinations. The computer 110 may be configured to manipulate the display device image 315 in a variety of ways to creating interesting display device images 315 over the plurality of displays 191. In one embodiment, the image 315 is split over the plurality of displays to make a single, unified image 315. In another embodiment, the image 315 scrolls from one display device 191 to another. In other embodiments, a primary image 315 is displayed on a first monitor and a second image with additional detail is displayed on a second display device 191. Of course, these are simply examples and not limitations and the concepts can be combined and mixed in a variety of applicable ways. In other embodiments, as previously mentioned, the computer 110, may be in a cloud and may be accessed from the retail store to control the display device 191.

At block 240, inputs from the mobile communication device 310 may be communicated to the display device 191 in the retail environment 305 to move an indication 440 on the display device 191 in the retail store related to the inputs on the mobile communication device. The indication 440 on the display device 191 may be a type of a pointer such as an arrow that is moved by a mouse on modern computer systems 110. In other embodiments, the indication may simply move from one item on the display device 191 to another item in the display device 191. In yet another embodiment, the indication 440 may be related to the type of store. As an example and not a limitation, the indication in a car dealer may be a car that moves in response to movements made on the mobile computing device 310. The input may be any inputs made to the display device 191 on the mobile computing device 310 or by using directional controls on the mobile computing device 310 such as a trackball, joystick, or other input device 445. In other embodiments, a pointer or a finger may be used on a touch sensitive display device to direct the indication 440. The indication 440 may first be made on the mobile computing device 310 and then may be communicated to the computing device 110 which may direct the movement of the pointer 440 on the display device 191.

In some embodiments, the input is not limited to moving a pointer 440 on a user interface 320 displayed on the mobile computing device 310. The input could be a wide variety of electronic signals. In one embodiment, the input may be a photo from a mobile computing device 300. The photo may be used in a variety of ways. In one embodiment, the photo is reviewed and if it of a known object, related data may be displayed. In another embodiment, the photo is displayed on the display device 191 and clothes or related goods are displayed on or around the photo. Of course, other ways of using the input photo are possible and are contemplated.

In another embodiment, the input may be simply shaking a mobile computing device 310. If the mobile computing device 310 has an accelerometer, the shaking may be used as an input to the computer device 110 which may cause the display device 191 to react. The reaction may be that the image on the display device 191 may shake or that the display device 191 may become brighter. The mobile computing device 310 may also be tilted as a way to adjust the display. For example, if the display device 191 is of a catalog, tilting the mobile computing device 310 in one direct may cause the virtual catalog page to flip in one direction and tilting the mobile computing device 310 in another direction may cause the virtual catalog page to turn in an opposite direction.

In some embodiments, the input may be a voice command. The voice command may be analyzed by the mobile computing device 310 or by the computer 110. If the voice command is understood, a related action may be undertaken. If the voice command is not understood, the display device 191 may display device a question mark, a humorous image or may do nothing at all. Of course, other inputs are possible and are contemplated.

At block 250, the indication on the display device 191 in the retail store may be maneuvered over selectable areas 430 and using the inputs on mobile communication device 310 such as the trackball or touch-screen to select a selectable area 430 on the display device 191. Similar to moving a mouse on a personal computer, the indication 440 or arrow may be moved on the mobile computing device 310 and the arrow 440 may be displayed as moving in a similar fashion on the display device 191. In some embodiments, the movement may use anticipation to move the indication from a first selectable area 430 to the selectable area 430 in the path of the movement of the indication 440.

At block 260, an adjusted image 500 may be displayed on the display device 191 in response to the selected item 430 wherein the adjusted image 500 comprises additional retail related data and at least one selectable area. The adjusted image 500 may be virtually any image that is related to the selected item. For example and not limitation, the following are possible adjusted images: Turning a page in a catalog; selecting an item in the first image; displaying additional detail related to the item; displaying the selected item on a user; displaying the select item; panning the item; rotating the item; and pivoting the item Turning a page in a catalog may be accomplished in a variety of ways. In one embodiment, the desired page is simply substituted for the present page. In other embodiments, the transition includes the illusion of a page being turned in a catalog. Of course, other manners of turning pages are possible and are contemplated.

Selecting an item 430 may entail using the interface 320 on the mobile computing device 310. The interface 320 may be device specific such as the interface device 320 on the mobile computing device 310. In another embodiment, a dedicated interface 320 may be part of the application that is loaded. The selection may be made by tapping an item or in any manner appropriate in relation to the selection and the interface.

Displaying additional detail may be accomplished in a variety of ways. In one example, if an item is selected, an additional page of detail on the item may be displayed. The additional page may be on the display device 191 or if there is a plurality of display devices, the additional page may be displayed on a second display device 191. The additional detail may also be displayed as a window inside the display device 191. Attention grabbing transitions may also be used to not only provide additional detail to the user, but also to create attention within the retail environment on the additional detail that is available using the mobile computing device 310.

The additional content may be virtually any data related to the selected data. In some embodiments, the additional data is data that is not available elsewhere but only in the retail environment. Some sample additional detail includes, but is not limited to additional video, additional sound, additional images, additional text, additional colors, additional goods, additional sale prices, additional catalog pages and additional data regarding purchasing trends.

In addition, displaying additional data may also include displaying the selected item on a user, displaying the selected item, panning the item, rotating the item and pivoting the item. In FIGS. 4A and 4B, a particular car color may be selected and in FIGS. 5A and 5B, the selected car and color from FIGS. 4a and 4B is displayed along with transmission options for the car and the related price. Of course, other adjusted images are possible and are contemplated.

Figures 5A, 5B:
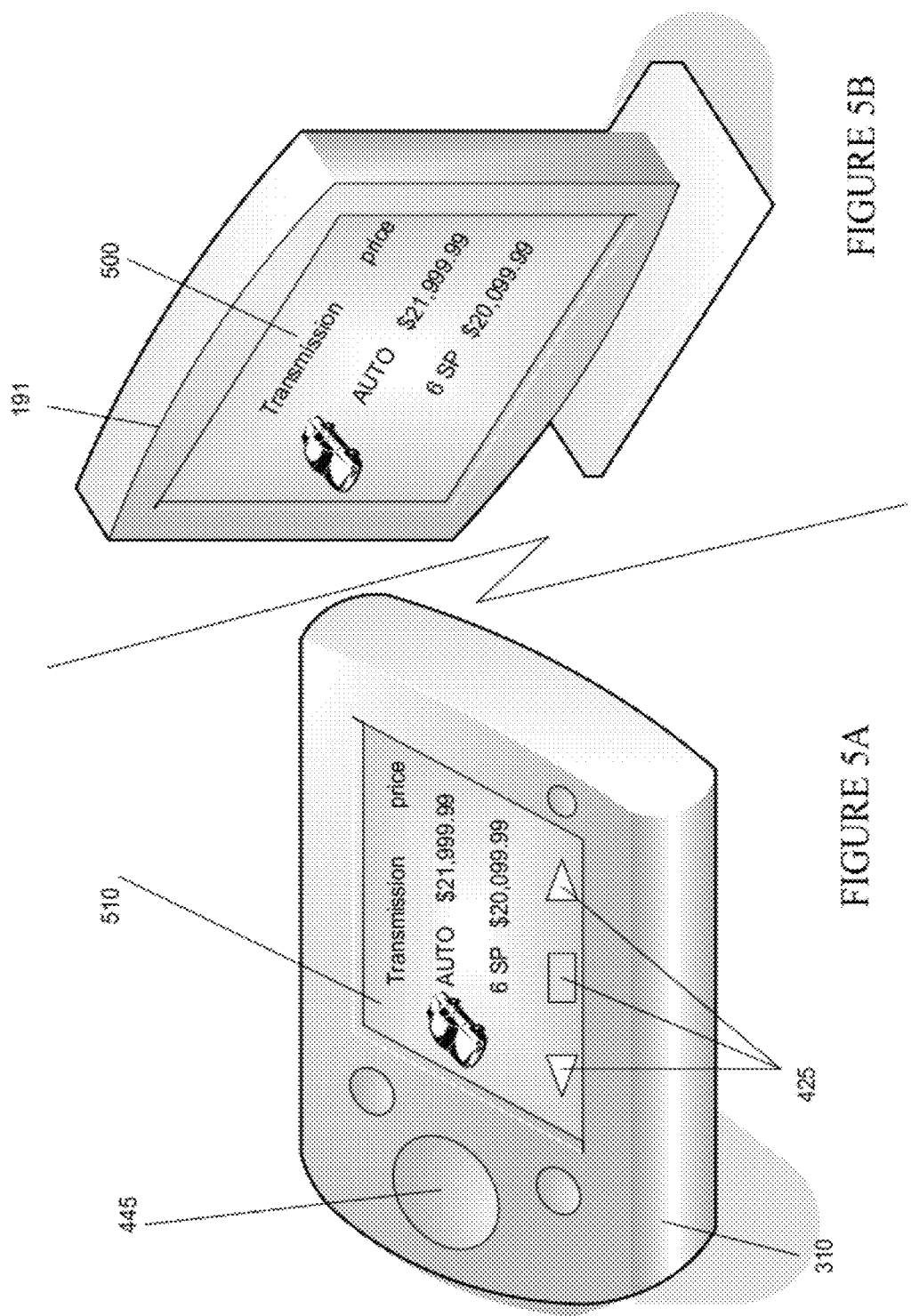
FIG. 5a illustrates an image of a modified user interface on the mobile computing device.
FIG. 5b illustrates a modified image on the display device in the retail environment.

At block 260, the user interface 320 of mobile communication device 310 may be modified to reflect the adjusted image on the display device 191 in the retail store. For example, the adjusted image may display device additional items that may be selected. FIG. 5A may be an example of additional detail 510 being displayed on the mobile computing device 310 after being selected in FIG. 4A.

FIGS. 4A, 4B, 5A and 5B If the retail environment is an auto dealer, a user may first select a car from a display device of a variety of cars. Next, the user may make additional selections that are specifically related to that car, such as the interior options, interior colors, interior fabrics, etc. Each of these displays may have additional content. For example, when a user is selecting a wheel combination, a video of the wheel moving on the selected model may be displayed and such a display device may be available only in the retail environment.

The processor 120 may also be configured to determine a location of the user in the retail environment using location signals in the mobile communication device 310 and displaying images that relate to the location of the user in the retail environment. For example, if the user is near jeans, the display device 191 may display device images 315 related to a sale on jeans. In additional embodiments, the location of the user may be received by using RFID signals from goods in the store that a user has selected. Visual sensors may also be used to assist verifying a location of a shopper in the store.

In use, there may be times when more than one user desires to communicate with the display device 191 in the retail environment 305. In one embodiment, a queue is created that tracks users that desire to communicate with the display device 191. The queue may be displayed on the display device 191, may be displayed on the mobile computing device 310 of the various shoppers or may be kept internally in the computing system 110. When a user leaves the store, the user may be removed from the queue. In another embodiment, known users that are considered profit centers or especially valuable customers may be allowed to move ahead in the queue. Of course, other arrangements are possible.

In action, a shopper with a mobile computing device 310 like a cell phone may walk into a retail environment such as a jeans store. The user's cell phone may ring to alert the shopper that an application is available to control one or more displays in the store. In other embodiments, the display device 191 may note that the display device 191 may be controlled by a mobile computing device 310. If the shopper is interested, the application is installed and a user interface 310 is displayed to the shopper on the mobile computing device 310. The interface 310 may be general information about the jeans that are available or any sales that are occurring. If the computer 110 can determine the location of the user in the store such as by GPS or by RFID signals, the interface 315 may also display device information about the jeans that are in the near vicinity of the user. The shopper may then use the user interface 320 on the mobile computing device 310 to select selectable items 430, such as jeans in stock in a desired size. The movement of the user on the user interface 320 may move a selector 440 on the display device 191 and selectable items 430 may be highlighted 435 on the user interface 320, on the display device 191 or on both devices 310 and 191. The shopper may then select a selectable item 430 using the user interface 320 and additional information about the selected items 430 may be displayed. A modified user interface 510 may be displayed that displays additional selectable items.

One advantage of the many advantages of the system is that users can now interact with a display device 191 in a store to obtain the information desired. The users will be able to use their own or a store wireless computing device 310 to interact and control one or more displays 191. As a result, the shoppers will be more interested in the display device 191 as the shopper can control the display device 191 to illustrate the information that the shopper most desires.

The invention claimed is:

1. A method of communicating with a display device in a retail store using a mobile communication device comprising:
    establishing communication between the mobile communication device and a receiving device in the retail store;
    on the mobile communication device,
    receiving an indication that an application is available to interact with the display device in the retail store;
    if the application is installed on the mobile communication device, displaying a user interface on the mobile communication device that allows a user to make one or more inputs that affect the display device in the retail store, wherein:
    the display device in the retail store comprises retail related data and at least one selectable area, the user interface of the mobile communication device comprises navigation selections that control the display device in the retail store, and the user interface displays a size appropriate version of images on the display device in the retail store;

communicating inputs from the mobile communication device to the display device in the retail store to move an indication on the display device in the retail store related to the inputs on the mobile communication device, the moved indication first moved by the user on the mobile communication device and then communicated to the receiving device for directing corresponding movement of the moved indication on the display device in the retail store;

maneuvering the indication on the display device in the retail store over selectable areas and using the inputs on the mobile communication device to select a selectable area on the display device and to display an adjusted image on the display device in response to the selected item wherein the adjusted image comprises additional retail related data and at least one selectable area; and modifying the user interface of the mobile communication device to reflect the adjusted image on the display device in the retail store, wherein if there is more than one display device, coordinating the image to be displayed in a unified manner on the display devices.

2. The method of claim 1, wherein selectable areas are highlighted on the user interface on the mobile communication device.

3. The method of claim 2, wherein:

maneuvering the indication includes maneuvering the indication on the display device in the retail store, using anticipation to move the indication from a first selectable area to a second selectable area in a path of the movement of the indication.

4. The method of claim 1, wherein there are a plurality of display devices in the retail store.

5. The method of claim 1, wherein the adjusted image comprises an image selected from a group comprising:

turning a page in a catalog;
selecting an item in the first image;
displaying additional detail related to the item;
displaying the selected item on a user;
displaying the selected item;
panning the item;
rotating the item; and
pivoting the item.

6. The method of claim 1, wherein the adjusted image in the retail store comprises additional content that is not available outside the retail store.

7. The method of claim 6, wherein the additional content includes one or more of:

additional video;
additional sound;
additional images;
additional text;
additional colors;
additional goods;
additional sale prices;
additional catalog pages; or
additional data regarding purchasing trends.

8. The method of claim 1, further comprising determining if the user is a known user, based on:

receiving electronic signals from the user; and
analyzing the electronic signals to determine if the electronic signals are recognized as belonging to a known user.

9. The method of claim 1, further comprising determining a location of the user in the retail store using location signals in the mobile communication device and displaying images that relate to the location of the user in the retail store.

10. The method of claim 9, wherein determining the location of the user further comprises receiving RFID signals from goods in the store that the user has selected.

11. A mobile computing device comprising a processor, a memory and an input/output device wherein the processor is configured to execute computer executable instructions, the computer executable instructions comprising instructions for:

establishing communication between the mobile computing device and a receiving device in a retail store;

receiving an indication that an application is available to interact with at least one display device in the retail store;

if the application is installed on the mobile computing device, displaying a user interface on the mobile computing device that allows a user to make one or more inputs that affect the display device in the retail store, wherein:

the display device in the retail store comprises retail related data and at least one selectable area, the user interface of the mobile computing device comprises navigation selections that control the display device in the retail store, and the user interface displays a size appropriate version of images on the display device in the retail store;

communicating inputs from the mobile computing device to the display device in the retail store to move an indication on the display device in the retail store related to the inputs on the mobile computing device, the moved indication first moved by the user on the mobile computing device and then communicated to the receiving device for directing corresponding movement of the moved indication on the display device in the retail store;

maneuvering the indication on the display device in the retail store over selectable areas and using the inputs on the mobile computing device to select a selectable area on the display device and to display an adjusted image on the display device in response to the selected item, the adjusted image comprising additional retail related data and at least one selectable area; and modifying the user interface of the mobile computing device to reflect the adjusted image on the display device in the retail store, wherein if there is more than one display device, coordinating the image to be displayed in a unified manner on the display devices.

12. The mobile computing device of claim 11, wherein selectable areas are highlighted on the user interface on the mobile computing device and wherein the selectable areas are highlighted on the display device when the user moves a pointer over the selectable areas.

13. The mobile computing device of claim 11, wherein the adjusted image comprises an image selected from a group comprising:

turning a page in a catalog;
selecting an item in the first image;
displaying additional detail related to the item;
displaying the selected item on a user;
displaying the selected item;
panning the item;
rotating the item; and
pivoting the item.

14. The mobile computing device of claim 13, wherein the additional content includes one or more of:
   additional video;
   additional sound;
   additional images;
   additional text;
   additional colors;
   additional goods;
   additional sale prices;
   additional catalog pages; or
   additional data regarding purchasing trends.

15. The mobile computing device of claim 11, wherein the computer executable instructions comprise instructions for determining if the user is a known user, based on:
   receiving electronic signals from the user; and
   analyzing the electronic signals to determine if the electronic signals are recognized as belonging to a known user.

16. A hardware computer storage medium physically configured according to computer executable instructions, the computer instructions comprising instructions for:
   establishing communication between a mobile communication device and a receiving device in a retail environment;
   receiving an indication that an application is available to interact with at least one display device in the retail environment;
   if the application is installed on the mobile communication device, displaying a user interface on the mobile communication device that allows a user to make one or more inputs that affect the display device in the retail environment, wherein:
      the display device in the retail environment comprises retail related data and at least one selectable area,
      the user interface of the mobile communication device comprises navigation selections that control the display device in the retail environment, and
      the user interface displays a size appropriate version of images on the display device in the retail environment;
   communicating inputs from the mobile communication device to the display device in the retail environment to move an indication on the display device in the retail environment related to the inputs on the mobile communication device, the moved indication first moved by the user on the mobile communication device and then communicated to the receiving device for directing corresponding movement of the moved indication on the display device in the retail environment;
   maneuvering the indication on the display device in the retail environment over selectable areas and using the inputs on the mobile communication device to select a selectable area on the display device and to display an adjusted image on the display device in response to the selected item, the adjusted image comprising additional retail related data and at least one selectable area; and
   modifying the user interface of the mobile communication device to reflect the adjusted image on the display device in the retail environment, wherein if there is more than one display device, coordinating the image to be displayed in a unified manner on the display devices.

17. The computer storage medium of claim 16, wherein the computer instructions include instructions for determining if the user is a known user, based on:
   receiving electronic signals from the user; and
   analyzing the electronic signals to determine if the electronic signals are recognized as belonging to a known user.

18. The computer storage medium of claim 16, wherein selectable areas are highlighted on the user interface on the mobile computing device and wherein the selectable areas are highlighted on the display device when the user moves a pointer over the selectable areas.

19. The method of claim 1, wherein the computer executable instructions comprise instructions for:
   if the application is not installed on the mobile communication device, displaying an option to download the application to the mobile communication device.

20. The mobile computing device of claim 11, wherein the computer executable instructions comprise instructions for:
   if the application is not installed on the mobile computing device, displaying an option to download the application to the mobile computing device.

\* \* \* \* \*